(12) United States Patent
Ogino et al.

(10) Patent No.: US 7,301,294 B2
(45) Date of Patent: Nov. 27, 2007

(54) MOTOR SPEED CONTROL INTEGRATED CIRCUIT

(75) Inventors: Koichiro Ogino, Ota (JP); Takashi Harashima, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/386,160

(22) Filed: Mar. 21, 2006

(65) Prior Publication Data

US 2007/0047928 A1 Mar. 1, 2007

(30) Foreign Application Priority Data

Aug. 31, 2005 (JP) .............................. 2005-252214

(51) Int. Cl.
*H02K 21/00* (2006.01)
(52) U.S. Cl. ...................... 318/254; 318/138; 318/439; 388/804
(58) Field of Classification Search ................ 388/804, 388/806, 809, 815; 326/89; 318/66, 77, 318/68, 254, 138, 439, 779, 798, 812
See application file for complete search history.

(56) References Cited

U.S. PATENT DOCUMENTS 6,204,693 B1 * 3/2001 Forster et al. ................ 326/89

FOREIGN PATENT DOCUMENTS

| JP | 2003-204692 | 7/2003 |
|---|---|---|
| JP | 2005-080500 | 3/2005 |

* cited by examiner

*Primary Examiner*—Karen Masih
(74) *Attorney, Agent, or Firm*—SoCal IP Law Group LLP; Steven C. Sereboff; John E. Gunther

(57) ABSTRACT

A motor speed control integrated circuit which controls a rotational speed of a motor by controlling the amount of current flowing through a drive coil of the motor. The integrated circuit comprises a first input terminal to have an analog speed-specifying signal in analog amount specifying the rotational speed of the motor input thereto; a second input terminal to have a digital speed-specifying signal in digital amount specifying the rotational speed of the motor input thereto; a reference voltage circuit that generates a reference voltage corresponding to the analog speed-specifying signal and/or the digital speed-specifying signal; a comparator that compares a speed voltage corresponding to the actual rotational speed of the motor and the reference voltage; and a control signal generator that generates and outputs a control signal for controlling the amount of current flowing through the drive coil based on the comparing result of the comparator.

10 Claims, 9 Drawing Sheets

| COMPARATOR INPUT | CONTROL SIGNAL VC | Accelerate/Decelerate Motor |
|---|---|---|
| VR<VV | L | Acceleration |
| VR>VV | H | Deceleration |

MOTOR SPEED CONTROL INTEGRATED CIRCUIT

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

The present application claims priority from Japanese Patent Application No. 2005-252214 filed on Aug. 31, 2005, which is herein incorporated by reference.

BACKGROUND

1. Field

The present invention relates to a motor speed control integrated circuit.

2. Description of the Related Art

Various electronic apparatuses have an exothermic body that generates heat when the electronic apparatus operates. To cool this exothermic body, a fan motor is usually provided. For example, in personal computers, servers and the like, the operating frequencies of the CPUs become increasingly higher causing the heat values of the CPUs to increase. Accordingly, a fan motor for cooling the CPU and a motor driver to drive the fan motor is usually provided in personal computers, servers and the like.

As a speed control method for fan motors, a speed servo control method has been proposed which has a PWM drive method combined therewith as shown, e.g., in FIG. 10 (refer, for example, to Japanese Patent Application Laid-Open Publication No. 2003-204692). To describe in detail, a speed specifying circuit 3 generates and outputs a speed-specifying signal to instruct to accelerate/decelerate based on a rotational speed detection signal obtained from a pulse generator PG of a motor 1 and on a number-of-rotations setting signal from an external device such as a microcomputer and a DSP, and has the speed-specifying signal integrated by an integrator 5. A comparator 9 compares a triangular-wave signal generated by a triangular-wave generator 7 and the speed-specifying signal integrated by the integrator 5 and generates a PWM (Pulse Width Modulation) signal as the comparing result. A motor driver 11 controls the rotational speed of the motor 1 on the basis of the PWM signal from the comparator 9 by causing a corresponding amount of current to the duty ratio of the PWM signal to flow through a drive coil of the motor 1. Furthermore, a hall element 13 is provided for the stator of the motor 1, and the motor driver 11 controls the rotational direction of the motor 1 by switching the direction of the current flowing through the drive coil on the basis of the hall element output of the hall element 13 indicating the detected position of the rotor.

As another speed control method for fan motors, a technique has been proposed which use a thermistor as shown, e.g., in FIG. 11 (refer, for example, to Japanese Patent Application Laid-Open Publication No. 2005-80500). To describe in detail, when an electronic apparatus operates with a heavy load and thus temperature increases, the cooling fan motor operates at full speed, but even when the load switches to being light and temperature decreases, the fan motor usually continues to operate at full speed thereby consuming power wastefully. Accordingly, a thermistor RTH is provided to monitor temperature variation, and a divided voltage VTH, produced by division of a supply voltage between a resistor R and the thermistor RTH, is adjusted according to the temperature variation. The motor driver 20 compares the divided voltage VTH and a triangular-wave signal (not shown) and generates a PWM signal as the comparing result and outputs to a transistor TR. As a result, the ON/OFF periods of the transistor TR change according to the duty ratio of the PWM signal from the motor driver 20. The change in the ON/OFF periods of the transistor TR adjusts the amount of current flowing through the drive coil of the fan motor, thereby controlling the rotational speed of the fan motor. For example, when the temperature of the electronic apparatus increases due to its heavy load, the resistance of the thermistor RTH and the divided voltage VTH drop thereby increasing the rotational speed of the fan motor. On the other hand, when the temperature of the electronic apparatus decreases due to its light load, the resistance of the thermistor RTH and the divided voltage VTH rise thereby decreasing the rotational speed of the fan motor.

As shown in FIGS. 10 and 11, various methods for the speed control of the fan motor can be adopted depending on the application of electronic apparatuses. Accordingly, logics other than the motor driver for driving a motor are implemented by farm ware incorporated in a general-purpose microcomputer, or circuitry consisting of discretes, or the like, and changes in design need to be made depending on their specifications, which is particularly troublesome.

SUMMARY OF THE INVENTION

According to a main aspect of the present invention to solve the above problem, there is provided a motor speed control integrated circuit which controls a rotational speed of a motor by controlling the amount of current flowing through a drive coil of the motor. The integrated circuit comprises a first input terminal to have an analog speed-specifying signal in analog amount specifying the rotational speed of the motor input thereto; a second input terminal to have a digital speed-specifying signal in digital amount specifying the rotational speed of the motor input thereto; a reference voltage circuit that generates a reference voltage corresponding to the analog speed-specifying signal and/or the digital speed-specifying signal; a comparator that compares a speed voltage corresponding to the actual rotational speed of the motor and the reference voltage; and a control signal generator that generates and outputs a control signal for controlling the amount of current flowing through the drive coil based on the comparing result of the comparator.

According to the present invention, there are provided a motor speed control integrated circuit having higher adaptability to types of motor speed specifying input.

Features and objects of the present invention other than the above will become clear by reading the description of the present specification with reference to the accompanying drawings.

DESCRIPTION OF THE DRAWINGS

For a more complete understanding of the present invention and the advantages thereof, reference is now made to the following description taken in conjunction with the accompanying drawings wherein.

DETAILED DESCRIPTION

At least the following matters will be made clear by the explanation in the present specification and the description of the accompanying drawings.

Configuration of Motor Speed Control System

An example of the configuration of a motor speed control system according to the present invention will be described based on FIG. 1 with reference to FIGS. 2 to 7.

Figure 1:
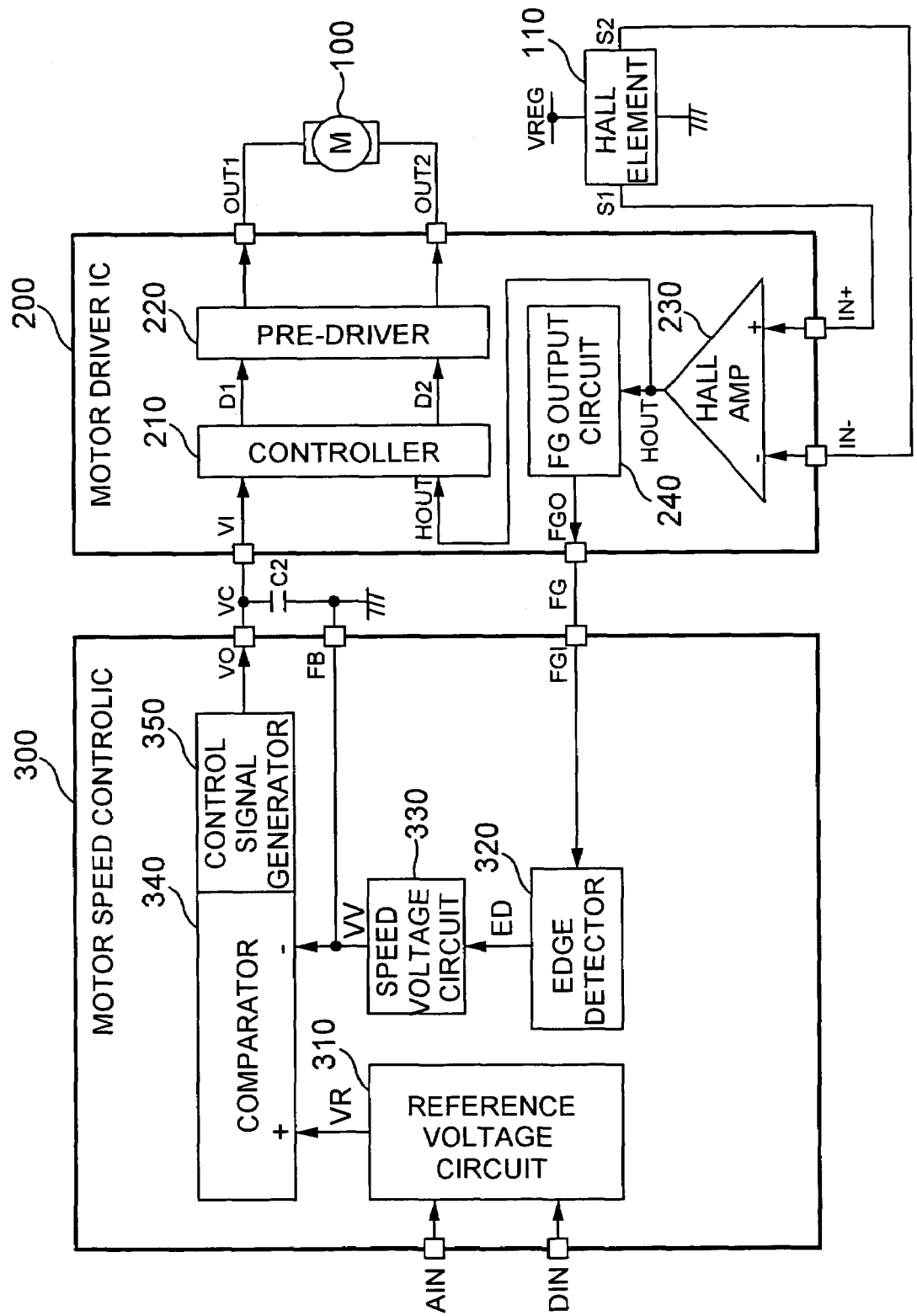
FIG. 1 is a diagram illustrating the configuration of a motor speed control system according to one implementation of the present invention.

The motor speed control system of FIG. 1 comprises a motor 100 to be controlled, a motor drive IC 200 (a first circuit of the invention), and a motor speed control IC 300 (a second circuit of the invention). In this case, a motor speed control integrated circuit according to the present invention comprises two chips that are the one-chip integrated motor drive IC 200 and the one-chip integrated motor speed control IC 300. Note that the motor speed control integrated circuit according to the present invention may be one chip into which the motor drive IC 200 and the motor speed control IC 300 are integrated.

The motor 100 is a so-called single-phase motor having a drive coil for a single phase, and further is a so-called hall motor having a hall element 110 fixed to its stator. The motor 100 is not limited to a single-phase hall motor, but a so-called three-phase hall motor having drive coils for three phases connected to be shaped like a star, a so-called sensor-less motor without a magnetic sensor such as the hall element 110, or the like can be adopted as the motor 100. The application of the motor 100 includes, for example, a fan motor for cooling a CPU mounted in a personal computer, a server or the like.

The hall element 110 generates rotational position detection signals S1, S2 which are shaped like a sine wave and opposite in phase to each other while the rotor of the motor 100 is rotating. The rotational position detection signals S1, S2 are a signal which renders the rotational position of the rotor detectable and whose frequency is proportional to the rotational speed of the motor 100. The rotational position detection signals S1, S2 output from the hall element 110 are input to IN+ and IN− terminals of the motor drive IC 200 respectively. The IN+ terminal is connected to the non-inverting input of a hall amplifier 230 inside the motor drive IC 200, and the IN− terminal is connected to the inverting input of the hall amplifier 230.

The motor drive IC 200 is an integrated circuit that drives the motor 100, and has terminals OUT1 and OUT2 that are connected to both ends of the drive coil of the motor 100; the IN+ and IN− terminals to which are input the rotational position detection signals S1, S2 from the hall element 110; a VI terminal to which is input a control signal VC from a VO terminal of the motor speed control IC 300; and an FGO terminal which outputs an FG signal to an FGI terminal of the motor speed control IC 300. The motor drive IC 200 comprises a controller 210, a pre-driver 220, the hall amplifier 230, and an FG output circuit 240.

The controller 210 controls the rotational speed of the motor 100 by varying the amount of current flowing through the drive coil of the motor 100 on the basis of the control signal VC input to the VI terminal of the motor drive IC 200 from the VO terminal of the motor speed control IC 300. Furthermore, the controller 210 generates switching control signals D1, D2 for controlling the switching of the direction of the current through the drive coil of the motor 100, based on the output HOUT of the hall amplifier 230.

The pre-driver 220 together with the drive coil of the motor 100 connected to the terminals OUT1 and OUT2 of the motor drive IC 200 constitutes a so-called H bridge circuit, where two transistor pairs that complementarily switch on/off and the drive coil are connected to be shaped like a letter H. The pre-driver 220 switches the direction of the current through the drive coil of the motor 100 by complementarily tuning on/off the two transistor pairs of the H bridge circuit on the basis of the switching control signals D1, D2 supplied from the controller 210.

The hall amplifier 230 generates and outputs a hall amp output HOUT produced by differential-amplifying the rotational position detection signals S1, S2 from the hall element 110. The hall amp output HOUT is supplied to the controller 210 and the FG output circuit 240.

The FG output circuit 240 generates and outputs the FG signal having a frequency corresponding to the actual rotational speed of the motor 100 based on the hall amp output HOUT from the hall amplifier 230. That is, the hall amp output HOUT indicates the rotational position of the rotor actually detected. Hence, intervals at which the predetermined position of the rotor is detected can be monitored via the hall amp output HOUT. Thus, the FG output circuit 240 generates the FG signal having a frequency corresponding to the actual rotational speed of the motor 100 based on the detection intervals for the predetermined position of the rotor, monitored via the hall amp output HOUT. The FG signal is input to the FGI terminal of the motor speed control IC 300 via the FGO terminal of the motor drive IC 200.

Figure 2:
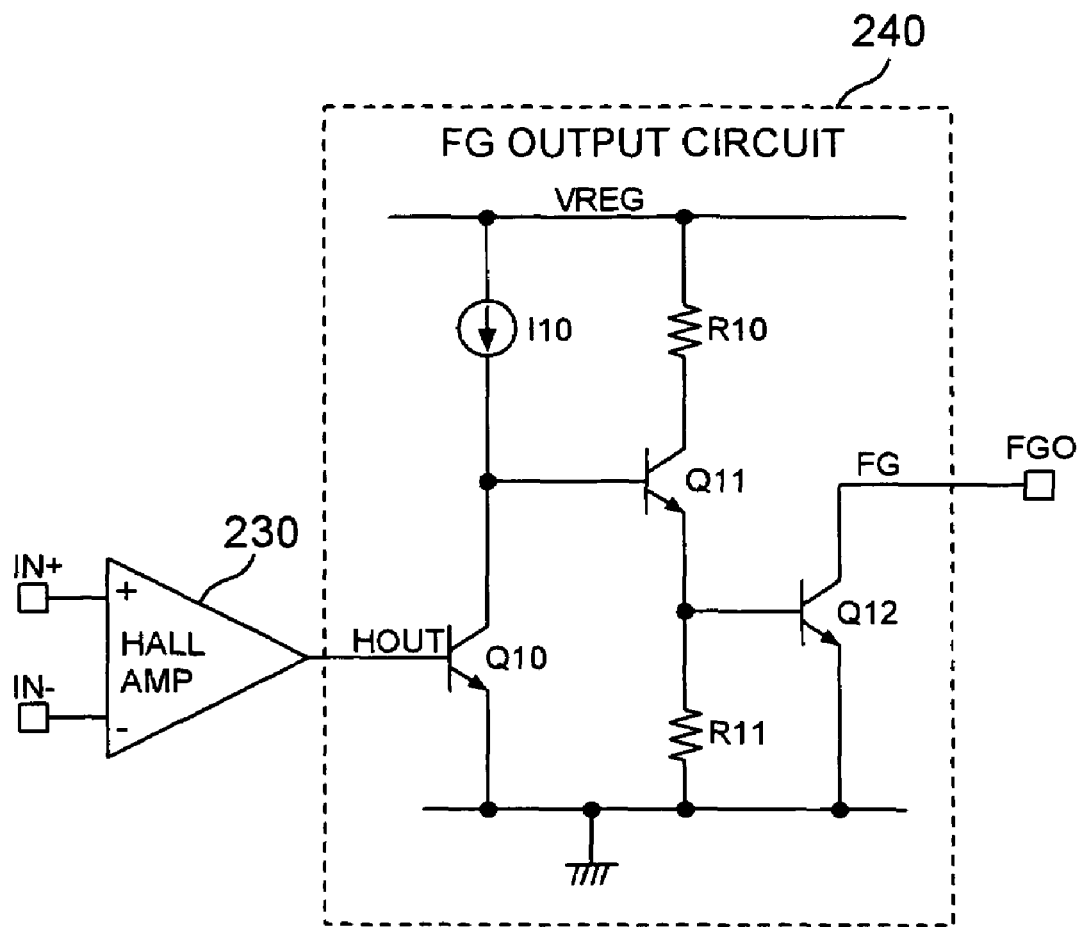
FIG. 2 is a diagram illustrating the configuration of an FG output circuit according to the one implementation of the present invention.

An implementation of the circuit configuration of the FG output circuit 240 will be described based on FIG. 2.

The hall amp output HOUT from the hall amplifier 230 is supplied to the base electrode of an emitter-grounded NPN transistor Q10. The collector electrode of the NPN transistor Q10 is connected to a current source I10 and to the base electrode of an NPN transistor Q11. The NPN transistor Q11 has its collector electrode connected to a resistor R10 and its emitter electrode connected to a resistor R11 and to an emitter-grounded NPN transistor Q12. The FG signal is output through the FGO terminal connected to the collector electrode of the NPN transistor Q12.

In this configuration of the FG output circuit 240, if the hall amp output HOUT is at a High level logically, the NPN transistor Q10 turns on thereby pulling the base electrode of the NPN transistor Q11 toward ground voltage, so that the NPN transistor Q11 turns off. Hence, the base electrode of the NPN transistor Q12 is pulled to ground voltage via a resistor R11, thereby turning off the NPN transistor Q12. Thus, in this case, the FG signal becomes the H level logically. On the other hand, if the hall amp output HOUT is at a Low level logically, the NPN transistors operate in ways opposite to the above, thereby turning on the NPN transistor Q12. Thus, in this case, the FG signal becomes the L level logically. As such, the FG signal emerges as a pulse signal that corresponds in logical level and frequency to the hall amp output HOUT.

The motor speed control IC 300 has an AIN terminal (a first input terminal of the invention) to which is input an analog speed-specifying signal in analog amount that specifies the rotational speed of the motor 100, and a DIN terminal (a second input terminal of the invention) to which is input a digital speed-specifying signal in digital amount that specifies the rotational speed of the motor 100. The motor speed control IC 300 further has the FGI terminal to which is input the FG signal from the FGO terminal of the motor drive IC 200; the VO terminal which outputs the control signal VC to the VI terminal of the motor drive IC 200; and an FB terminal through which the control signal VC output from the VO terminal is fed back to the inverting input of a comparator 340 via a capacitor C2. The motor speed control IC 300 further has a reference voltage circuit 310, an edge detector 320, a speed voltage circuit 330, the comparator 340, and a control signal generator 350.

The reference voltage circuit 310 generates and outputs a reference voltage VR having a level corresponding to the analog speed-specifying signal input to the AIN terminal and/or the digital speed-specifying signal input to the DIN terminal.

Figure 3:
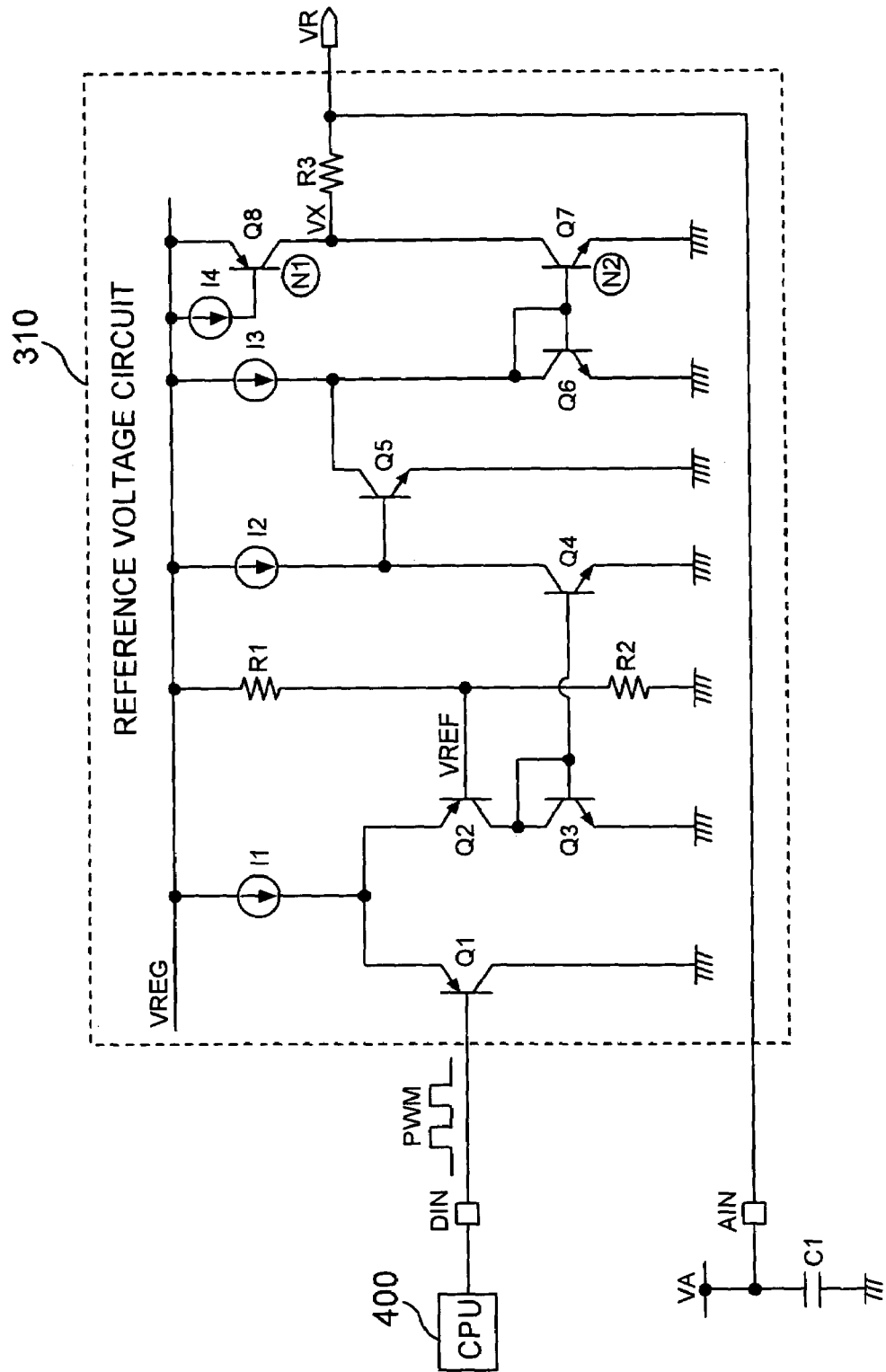
FIG. 3 is a diagram illustrating the configuration of a reference voltage circuit according to the one implementation of the present invention.
Figure 4:
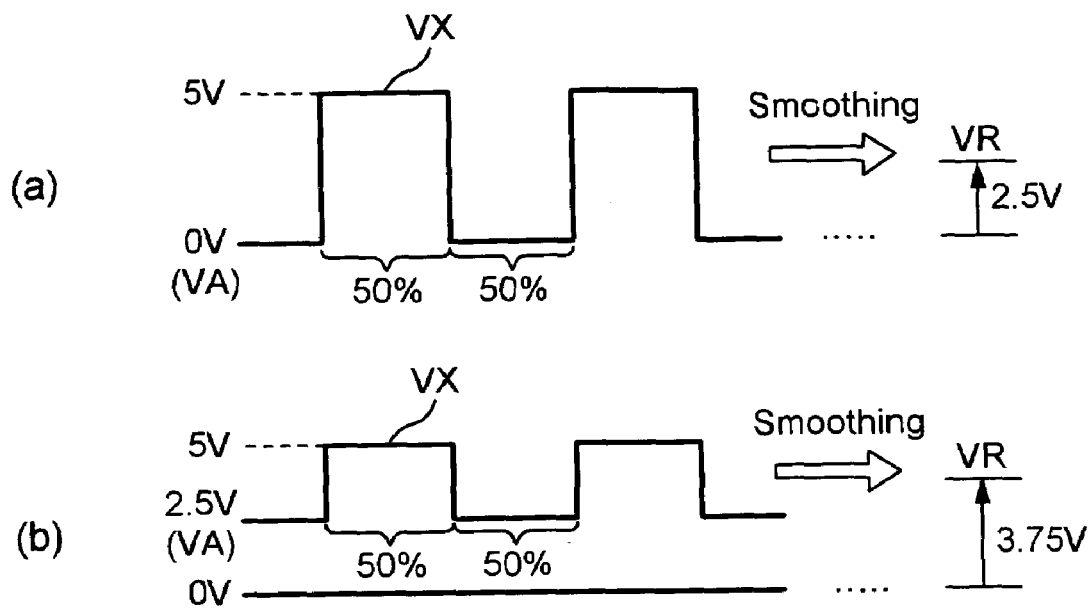
FIG. 4 is a diagram showing the case where both the DC voltage VA (analog speed control signal) and the PWM signal (digital speed control signal) are input and the duty ratio of the PWM signal is 50% and the bias voltage VREG is 5V, in which (a) shows a waveform of the reference voltage VR when the DC voltage VA is 0V, and (b) shows a waveform of the reference voltage VR when the DC voltage VA is 2.5V, according to the one implementation of the present invention.

Here, an implementation of the circuit configuration of the reference voltage circuit 310 will be described based on FIG. 3.

Figure 9:
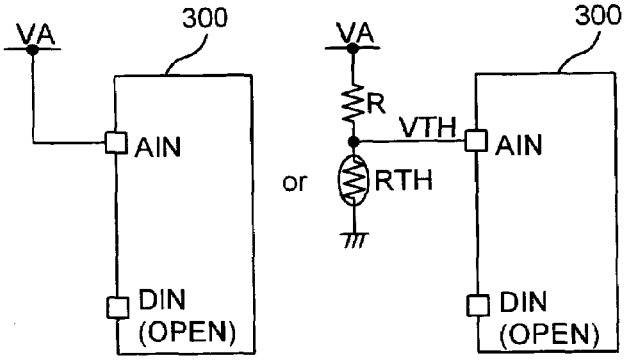
FIG. 9 is a diagram illustrating external circuits for types of speed specifying input for the motor speed control IC according to the one implementation of the present invention.
Figure 10:
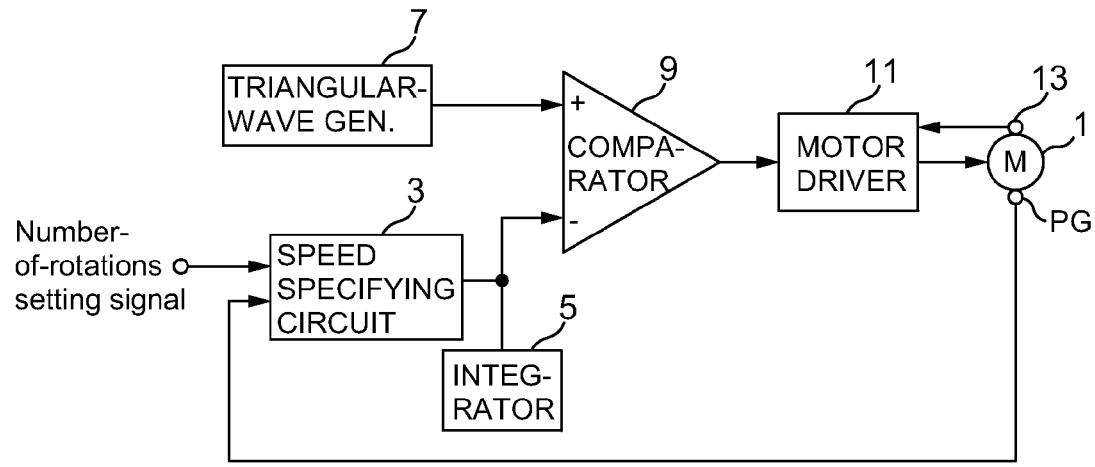
FIG. 10 is a diagram illustrating the configuration of a conventional motor speed control system.
Figure 11:
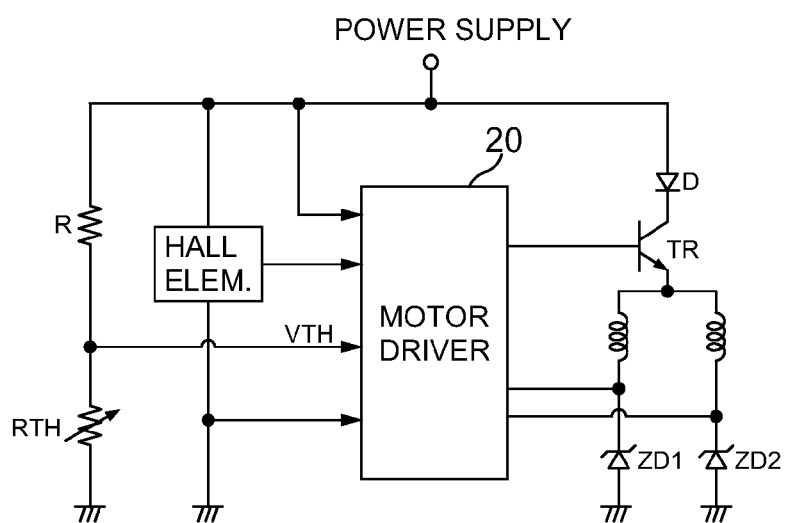
FIG. 11 is a diagram illustrating the configuration of another conventional motor speed control system.

This is the case where the DIN terminal is connected communication-feasibly to a CPU 400 (a processor of the invention) that controls the entire motor speed control system overall. A PWM (Pulse Width Modulation) signal from the CPU 400 that specifies the rotational speed of the motor 100 is input as the digital speed-specifying signal to the DIN terminal. Meanwhile, the AIN terminal is connected to a smoothing capacitor C1 which forms an RC filter circuit together with a resistor R3. Further, a direct-current voltage VA that specifies the rotational speed of the motor 100 is applied as the analog speed-specifying signal to the AIN terminal. Note that the DIN terminal and the AIN terminal is not limited in usage to the above example shown in FIG. 3 but can adapt to various types of input as shown in FIG. 9.

A transistor pair of PNP transistors Q1, Q2 have their emitter electrodes connected in common and to a current source I1. The PWM signal from the DIN terminal is supplied to the base electrode of the PNP transistor Q1, and a referenced voltage VREF, produced by division of a bias voltage VREG between resistors R1 and R2 connected in series, is applied to the base electrode of the PNP transistor Q2. The collector and base electrodes of the PNP transistor Q2 are short-circuited to form a diode and connected to an emitter-grounded NPN transistor Q3. The base electrode of the NPN transistor Q3 is connected to the base electrode of an emitter-grounded NPN transistor Q4 so that the NPN transistors Q3 and Q4 form a so-called current-mirror circuit.

The collector electrode of the NPN transistor Q4 is connected to a current source I2 and to the base electrode of an emitter-grounded NPN transistor Q5. The collector electrode of the NPN transistor Q5 is connected to a current source I3 and to a diode-connected, emitter-grounded NPN transistor Q6. The base electrode of the NPN transistor Q6 is connected to the base electrode of an NPN transistor Q7 so that the NPN transistors Q6 and Q7 form a so-called current-mirror circuit. The NPN transistor Q7 is connected in series to a PNP transistor Q8 having its base electrode connected to a current source I4. Note that the transistor size N2 of the PNP transistor Q8 is set greater than the transistor size N1 of the NPN transistor Q7 and that the NPN transistor Q7 is higher in capability of sinking a current. The connection point of the PNP transistor Q8 and the NPN transistor Q7 is connected to the resistor R3. A pulsed voltage VX at the connection point of the PNP transistor Q8 and the NPN transistor Q7 is smoothed by an RC filter circuit consisting of the resistor R3 and the smoothing capacitor C. The smoothed pulsed voltage VX is taken out as the reference voltage VR.

In this configuration of the reference voltage circuit 310, if the PWM signal is at the L level logically and lower in level than the referenced voltage VREF, the PNP transistor Q1 turns on such that a greater current flows through the PNP transistor Q1 than through the PNP transistor Q2, and thus the NPN transistors Q3, Q4 turn off. As a result, a current from the current source I2 flows into the base electrode of the NPN transistor Q5 turning on, and the base electrode of the NPN transistor Q6 is pulled toward ground voltage via the NPN transistor Q5. Thus, the NPN transistors Q6, Q7 turn off and the PNP transistor Q8 becomes ON. Hence, the pulsed voltage VX is pulled toward the bias voltage VREG and becomes the H level. This pulsed voltage VX is smoothed by the RC filter circuit consisting of the resistor R3 and the smoothing capacitor C to produce the reference voltage VR.

On the other hand, if the PWM signal is at the H level logically and higher in level than the referenced voltage VREF, the transistors operate in ways opposite to the above, thereby turning on the PNP transistor Q8 and the NPN transistor Q7. Note that since the NPN transistor Q7 is higher in capability of sinking a current than the PNP transistor Q8, the pulsed voltage VX is pulled toward ground voltage and becomes the L level logically. This pulsed voltage VX is smoothed by the RC filter circuit consisting of the resistor R3 and the smoothing capacitor C to produce the reference voltage VR.

In this way, the reference voltage circuit 310 converts the PWM signal input to the DIN terminal into the pulsed voltage VX having a voltage swing of from the bias voltage VREG to ground voltage. And the reference voltage circuit 310 has the RC filter circuit of the resistor R3 and the smoothing capacitor C smooth the pulsed voltage VX to output a direct-current voltage corresponding to the duty ratio of the PWM signal as the reference voltage VR. When a direct-current voltage VA is applied to the AIN terminal, the reference voltage circuit 310 outputs the direct-current voltage VA as it is, as the reference voltage VR.

Furthermore, when the PWM signal is input to the DIN terminal and the DC voltage VA is applied to the AIN terminal, the reference voltage circuit 310 superimposes on the pulsed voltage VX corresponding to the PWM signal the DC voltage VA applied to the AIN terminal as an offset component. Then, the pulsed voltage VX having the DC voltage VA superimposed thereon is smoothed by the RC filter circuit of the resistor R3 and the smoothing capacitor C to produce the reference voltage VR. For example, if the duty ratio of the PWM signal is 50% and the bias voltage VREG is 5V, when the DC voltage VA is 0V, the reference voltage VR becomes 2.5V as shown in (a) of FIG. 4, and when the DC voltage VA is 2.5V, the reference voltage VR becomes 3.75V as shown in (b) of FIG. 4.

In the above implementation, the relationship between the PWM signal and the reference voltage VR is that when the PWM signal is at the L level logically, the reference voltage VR becomes high, and when the PWM signal is at the H level logically, the reference voltage VR becomes low. Hence, if the on-duty of the PWM signal is set greater to accelerate the motor 100, the reference voltage VR becomes low, and if the on-duty of the PWM signal is set smaller to decelerate the motor 100, the reference voltage VR becomes high. In other words, when the reference voltage VR generated by the reference voltage circuit 310 is at the H level logically, the motor 100 is being decelerated, and when the reference voltage VR is at the L level logically, the motor 100 is being accelerated. Needless to say, the relationship between the PWM signal and the reference voltage VR may be set to be the opposite in high/low.

The FG signal input from the FGO terminal to the FGI terminal is supplied to the edge detector 320. The edge detector 320 detects both edges in the FG signal and in response thereto, produces and outputs an edge signal ED having a narrower pulse width than that of the FG signal ((a) and (b) of FIG. 6).

The edge signal ED output from the edge detector 320 is supplied to the speed voltage circuit 330. Here, the frequency of the edge signal ED is corresponding to the rotational speed of the motor 100. Hence, the speed voltage circuit 330 produces a speed voltage VV corresponding to the rotational speed of the motor 100 based on the edge signal ED.

Figure 5:
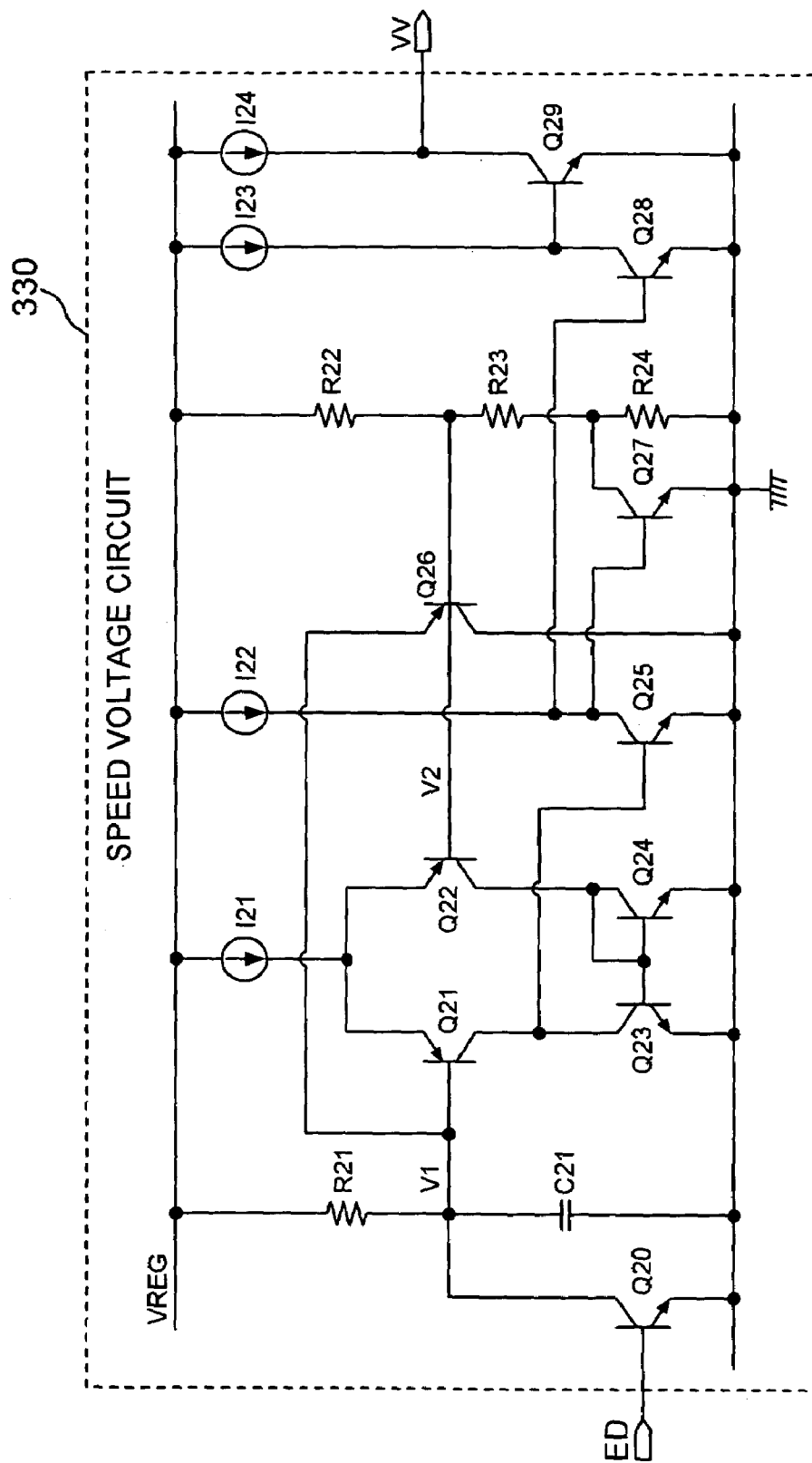
FIG. 5 is a diagram illustrating the configuration of a speed voltage circuit according to the one implementation of the present invention.
Figure 6:
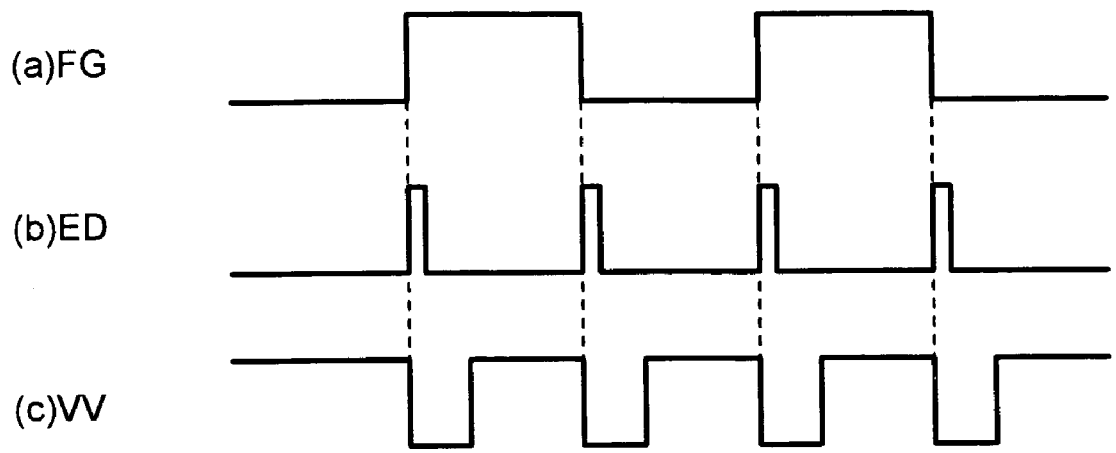
FIG. 6 is a diagram showing the waveforms of main signals of an edge detector and the speed voltage circuit according to the one implementation of the present invention.

Here, an implementation of the circuit configuration of the speed voltage circuit 330 will be described with reference to FIG. 5.

The series connection of a resistor R21 and a capacitor C21 has the bias voltage VREG applied thereto, and an emitter-grounded NPN transistor Q20 is connected in parallel with the capacitor C21. The edge signal ED is supplied to the base electrode of the NPN transistor Q20.

A transistor pair of PNP transistors Q21, Q22 has both emitter electrodes connected in common and to a current source I21. A charge/discharge voltage V1 of the capacitor C21 is applied to the base electrode of the PNP transistor Q21, and a divided voltage V2 produced by division of the bias voltage VREG between resistors R22 and R23, R24 connected in series is applied to the base electrode of the PNP transistor Q22. The collector electrodes of the transistor pair of PNP transistors Q21, Q22 are connected to a so-called current-mirror circuit consisting of an NPN transistor Q23 and a diode-connected NPN transistor Q24. The base electrode of the PNP transistor Q21 is connected to the emitter electrode of an NPN transistor Q26 having its collector grounded and the divided voltage V2 applied to its base electrode.

The connection point of the PNP transistor Q21 and the NPN transistor Q23 is connected to an emitter-grounded NPN transistor Q25. The collector electrode of the NPN transistor Q25 is connected to a current source I22, to an emitter-grounded NPN transistor Q27 connected in parallel with a resistor R24, and to the base electrode of an emitter-grounded NPN transistor Q28. The collector electrode of the NPN transistor Q28 is connected to a constant current source I23 and to the base electrode of an emitter-grounded NPN transistor Q29. The collector electrode of the NPN transistor Q29 is connected to a constant current source I24. The pulsed, speed voltage VV is output from the connection point of the constant current source I24 and the NPN transistor Q29.

In this configuration of the speed voltage circuit 330, when the edge detector 320 is not detecting an edge of the FG signal and thus the edge signal ED supplied to the base electrode of the NPN transistor Q20 is at the L level, the NPN transistor Q20 is OFF and thus the capacitor C21 is charged. If the charge/discharge voltage V1 applied to the base electrode of the PNP transistor Q21 is higher than the divided voltage V2 by the series connection of the resistors R22, R23, R24, a smaller current flows through the PNP transistor Q21 than through the PNP transistor Q22. Thus, the NPN transistor Q25 turns toward being off; the NPN transistor Q28 turns toward being on; and the NPN transistor Q29 turns toward being off. Thus, the speed voltage VV is pulled toward the bias voltage VREG and becomes the H level logically (see (b), (c) of FIG. 6).

On the other hand, where the edge detector 320 is detecting an edge of the FG signal and thus the edge signal ED supplied to the base electrode of the NPN transistor Q20 is at the H level, the transistors operate in ways opposite to the above and thereby the NPN transistor Q29 turns toward being on. Thus, the speed voltage VV is pulled toward ground voltage and becomes the L level logically (see (b), (c) of FIG. 6).

The L width (width of the L level) of the speed voltage VV corresponding to an edge of the FG signal detected is decided by an RC time constant of the resistor R21 and the capacity C21. Thus, the L width of the speed voltage VV is constant as long as the RC time constant is fixed even when the rotational speed of the motor 100 varies. However, the pulse period of the speed voltage VV varies because the pulse period of the FG signal and thus that of the edge signal ED vary with the rotational speed of the motor 100. Hence, a DC voltage produced by integrating the speed voltage VV varies with the rotational speed of the motor 100. For example, when the rotational speed of the motor 100 is higher, the pulse period of the FG signal is shorter, and the L width per period of the speed voltage VV is greater, thus lowering the DC voltage produced by integrating the speed voltage VV. On the other hand, when the rotational speed of the motor 100 is lower, the pulse period of the FG signal is longer, and the L width per period of the speed voltage VV is smaller, thus raising the DC voltage produced by integrating the speed voltage VV.

The comparator 340 compares the reference voltage VR generated by the reference voltage circuit 310 and the DC voltage produced by integrating the pulsed, speed voltage VV. The control signal generator 350 produces and outputs a control signal VC for controlling the amount of current flowing through the drive coil of the motor 100 by the motor drive IC 200 based on the comparing result of the comparator 340.

Figures 7, 8:
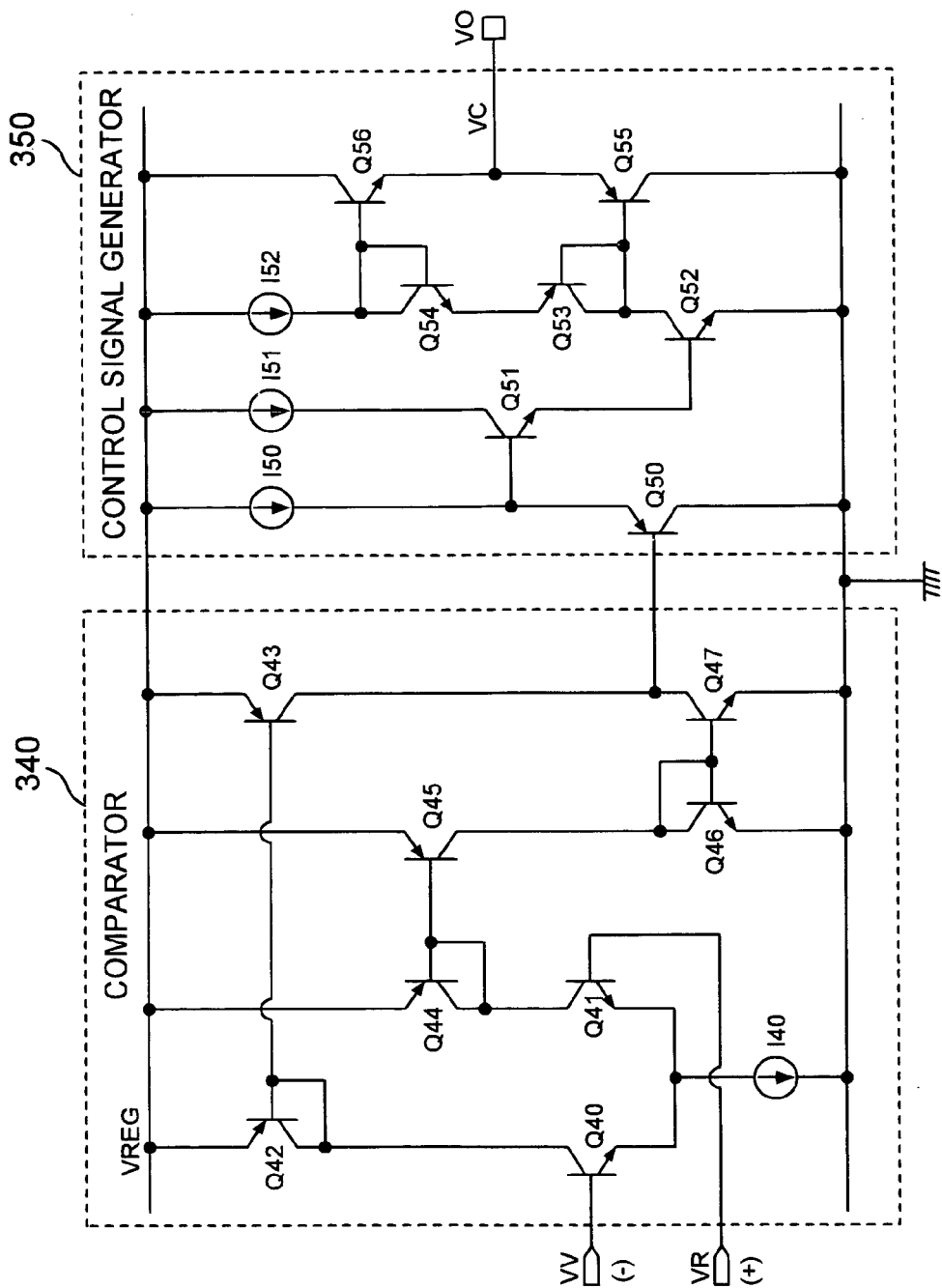
FIG. 7 is a diagram illustrating the configuration of a comparator and a control signal generator according to the one implementation of the present invention.
FIG. 8 shows the operation of a motor speed control IC according to the one implementation of the present invention.

Here, an implementation of the circuit configuration of the comparator 340 and the control signal generator 350 will be described with reference to FIG. 7.

A transistor pair of NPN transistors Q40, Q41 has both emitter electrodes connected in common and to a current source I40. The speed voltage VV from the speed voltage circuit 330 is applied to the base electrode (inverting input of the comparator 340) of the NPN transistor Q40, and the reference voltage VR from the reference voltage circuit 310 is applied to the base electrode (non-inverting input of the comparator 340) of the NPN transistor Q41. The speed voltage VV applied to the base electrode of the NPN transistor Q40 is a DC voltage obtained by integrating with the capacity C2 connected between the VO and FB terminals.

The collector electrode of the NPN transistor Q40 is connected to a diode-connected PNP transistor Q42 having the bias voltage VREG applied to its emitter electrode. The base electrode of the PNP transistor Q42 and the base electrode of the PNP transistor Q43 having the bias voltage VREG applied to its emitter electrode are connected in common so that the PNP transistors Q42, Q43 form a so-called current-mirror circuit.

The collector electrode of the NPN transistor Q41 is connected to a diode-connected PNP transistor Q44 having the bias voltage VREG applied to its emitter electrode. The base electrode of the PNP transistor Q44 and the base electrode of the PNP transistor Q45 having the bias voltage VREG applied to its emitter electrode are connected in common so that the PNP transistors Q44, Q45 form a so-called current-mirror circuit.

The collector electrode of the PNP transistor Q45 is connected to an emitter-grounded, diode-connected NPN transistor Q46. The base electrode of the NPN transistor Q46 and the base electrode of the NPN transistor Q47 connected in series with the PNP transistor Q43 and having its emitter grounded are connected in common so that the NPN transistors Q46, Q47 form a so-called current-mirror circuit.

The collector electrode of the NPN transistor Q47 is connected to the base electrode of a PNP transistor Q50 having its collector grounded. The emitter electrode of the PNP transistor Q50 is connected to a current source I50 and to the base electrode of an NPN transistor Q51. The collector electrode of the NPN transistor Q51 is connected to a current source I51 and the emitter electrode of the NPN transistor Q51 to the base electrode of an emitter-grounded NPN transistor Q52.

The collector electrode of the NPN transistor Q52 is connected to a diode-connected PNP transistor Q53. The base electrode of the PNP transistor Q53 and the base electrode of a PNP transistor Q55 having its collector grounded are connected in common so that the PNP transistors Q53, Q55 form a so-called current-mirror circuit.

The emitter electrode of the PNP transistor Q53 is connected to a diode-connected NPN transistor Q54. The collector electrode of the NPN transistor Q54 is connected to a current source I52, and the base electrodes of the NPN transistor Q54 and of an NPN transistor Q56 are connected in common so that the NPN transistors Q54, Q56 form a so-called current-mirror circuit.

The NPN transistor Q56 and the PNP transistor Q55 having their emitter electrodes connected in common form a series connection, and the control signal VC is output through the VO terminal connected to the connection point of the NPN transistor Q56 and the PNP transistor Q55.

In this configuration of the comparator 340 and of the control signal generator 350, when the speed voltage VV applied to the base electrode of the NPN transistor Q40 is higher than the reference voltage VR applied to the base electrode of the NPN transistor Q41, that is, when the actual rotational speed of the motor 100 is lower than the rotational speed specified by the analog speed-specifying signal and/or the digital speed-specifying signal (in an instruct-to-accelerate state), a greater current flows through the NPN transistor Q40 than through the NPN transistor Q41. Thus, greater currents flow through the current-mirror circuit (Q42, Q43) than through the current-mirror circuit (Q46, Q47). Hence, the base electrode of the PNP transistor Q50 is pulled toward the bias voltage VREG, and the PNP transistor Q50 turns toward being off. As a result, the NPN transistors Q51, Q52 turns toward being on, thereby lowering the level of the control signal VC.

On the other hand, when the speed voltage VV applied to the base electrode of the NPN transistor Q40 is lower than the reference voltage VR applied to the base electrode of the NPN transistor Q41, that is, when the actual rotational speed of the motor 100 is higher than the rotational speed specified by the analog speed-specifying signal and/or the digital speed-specifying signal (in an instruct-to-decelerate state), the transistors operate in ways opposite to the above, and thus the NPN transistors Q51, Q52 turns toward being off, thereby raising the level of the control signal VC.

The control signal VC is used as a control voltage for the motor drive IC 200. As to the logic of the motor drive IC 200, when the level of the control signal VC is high, the rotational speed of the motor 100 is decelerated, and when the level of the control signal VC is low, the rotational speed of the motor 100 is accelerated. In this case, the motor speed control IC 300 performs motor speed control as shown in FIG. 8.

To describe in detail, in the state where the speed voltage VV is higher than the reference voltage VR (the instruct-to-accelerate state), the control signal VC output from the motor speed control IC 300 continues to descend in level. Meanwhile, the rotational speed of the motor 100 continues to ascend. As a result, the level of the speed voltage VV gradually descends and approaches that of the reference voltage VR. On the other hand, in the state where the speed voltage VV is lower than the reference voltage VR (the instruct-to-decelerate state), the control signal VC output from the motor speed control IC 300 continues to ascend in level. Meanwhile, the rotational speed of the motor 100 continues to descend. As a result, the level of the speed voltage VV gradually ascends and approaches that of the reference voltage VR. In this way, the motor speed control IC 300 compares the reference voltage VR and the speed voltage VV and controls the level of the control signal VC, the control voltage for the motor drive IC 200, such that the levels of both the voltages coincide.

Examples of use of AIN and DIN Terminals of Motor Speed Control IC

FIG. 9 shows examples of use of the AIN and DIN terminals of the motor speed control IC 300 for types of speed specifying input according to the implementation of the present invention. As shown in the Figure, the motor speed control IC 300 is adaptable to any of the case where only the analog speed-specifying signal is input thereto through the AIN terminal, the case where only the digital speed-specifying signal is input thereto through the DIN terminal, and the case where both the analog and digital speed-specifying signals are input to the AIN and DIN terminals respectively.

First, the case where only the analog speed-specifying signal is input thereto through the AIN terminal will be described.

In an example of this case, the DC voltage VA in analog amount specifying the rotational speed of the motor is compared with the speed voltage VV indicating the actual rotational speed of the motor 100. To do this control, with the DIN terminal left open, the DC voltage VA that is the analog speed-specifying signal can be directly input to the AIN terminal. In this case, the motor speed control IC 300 uses the DC voltage VA applied to the AIN terminal, as it is, as the reference voltage VR.

In another example of this case, when a thermistor RTH detects that the temperature of the CPU 400 has increased due to its heavy load using the characteristic of the thermistor RTH that its resistance varies with temperature, the rotational speed of the motor 100 is increased. On the other hand, when the thermistor RTH detects that the temperature of the CPU 400 has decreased due to its light load, the rotational speed of the motor is decreased. To do this control, with the DIN terminal left open, there is provided a series connection of a resistor R and the thermistor RTH to which the DC voltage VA, the analog speed-specifying signal, is applied, and a divided voltage VTH produced by division of the DC voltage VA with the series connection is applied to the AIN terminal. In this case, the motor speed control IC 300 uses the divided voltage VTH applied to the AIN terminal as the reference voltage VR.

Next, the case where only the digital speed-specifying signal is input thereto through the DIN terminal will be described.

In an example of this case, the PWM signal in digital amount specifying the rotational speed of the motor is compared with the speed voltage VV indicating the actual rotational speed of the motor 100. To do this control, the DIN terminal is communication-feasibly connected to the CPU400, and a smoothing capacitor C is connected to the AIN terminal so as to form a RC filter circuit to smooth the pulsed voltage VX corresponding to the PWM signal (see FIG. 3). With this configuration, the CPU400 supplies the PWM signal that is the digital specifying signal to the DIN terminal. In this case, the motor speed control IC 300 uses as the reference voltage VR a voltage produced by the smoothing capacitor C smoothing the PWM signal input to the DIN terminal.

Next, the case where the analog and digital speed-specifying signals are input to the AIN and DIN terminals respectively will be described.

In an example of this case, the DC voltage VA applied to the AIN terminal is set higher than that for the necessary rotational speed of the motor 100. And when the work load of the CPU 400 is light, a measure to save energy is carried out where the duty ratio of the PWM signal supplied to the DIN terminal is controlled to decrease the rotational speed of the motor 100. To do this control, the DIN terminal is communication-feasibly connected to the CPU400 so that the PWM signal can be supplied, and a smoothing capacitor C is connected to the AIN terminal so as to form a RC filter circuit in the reference voltage circuit 310. Furthermore, there is provided a series connection of a resistor R and the thermistor RTH to which the DC voltage VA, the analog speed-specifying signal, is applied, and a divided voltage VTH produced by division of the DC voltage VA with the series connection is applied to the AIN terminal. In this case, the reference voltage circuit 310 uses as the reference voltage VR the divided voltage VTH applied to the AIN terminal superimposed on a voltage produced by the smoothing capacitor C smoothing the PWM signal input to the DIN terminal.

Although the preferred implementation of the present invention has been described, the above implementation is provided to facilitate the understanding of the present invention and not intended to limit the present invention. It should be understood that various changes and alterations can be made therein without departing from the spirit and scope of the invention and that the present invention includes its equivalents.

The invention claimed is:

1. A motor speed control integrated circuit which controls a rotational speed of a motor by controlling the amount of current flowing through a drive coil of the motor, the integrated circuit comprising:
   a first input terminal to have an analog speed-specifying signal in analog amount specifying the rotational speed of the motor input thereto;
   a second input terminal to have a digital speed-specifying signal in digital amount specifying the rotational speed of the motor input thereto;
   a reference voltage circuit that
      generates a reference voltage corresponding to the analog speed-specifying signal, when only the analog speed-specifying signal is input to the first input terminal, and that
      generates a reference voltage corresponding to the digital speed-specifying signal, when only the digital speed-specifying signal is input to the second input terminal, and that
      generates a reference voltage corresponding to the analog speed-specifying signal and the digital speed-specifying signal, when the analog speed-specifying signal and the digital speed-specifying signal are input to the first input terminal and the second input terminal, respectively;
   a comparator that compares a speed voltage corresponding to the actual rotational speed of the motor and the reference voltage; and
   a control signal generator that generates and outputs a control signal for controlling the amount of current flowing through the drive coil based on the comparing result of the comparator.

2. The motor speed control integrated circuit according to claim 1, wherein the analog speed-specifying signal is a direct-current voltage to specify the rotational speed of the motor, and
   wherein the reference voltage circuit generates the reference voltage corresponding to the direct-current voltage, when only the analog speed-specifying signal is input to the first input terminal.

3. The motor speed control integrated circuit according to claim 1, wherein
   the analog speed-specifying signal is a divided voltage produced by division of a direct-current voltage with a series connection of a register and a thermistor to which the direct-current voltage is applied, and wherein
   the reference voltage circuit generates the reference voltage corresponding to the divided voltage, when only the analog speed-specifying signal is input to the first input terminal.

4. The motor speed control integrated circuit according to claim 1, wherein
the digital speed-specifying signal is a pulse width modulation signal from a processor to specify the rotational speed of the motor, and wherein
the reference voltage circuit generates the reference voltage corresponding to the pulse width modulation signal, when only the digital speed-specifying signal is input to the second input terminal.

5. The motor speed control integrated circuit according to claim 1, wherein
the analog speed-specifying signal is a direct-current voltage to specify the rotational speed of the motor, and wherein
the digital speed-specifying signal is a pulse width modulation signal from a processor to specify the rotational speed of the motor, and wherein
the reference voltage circuit generates the reference voltage that is a voltage corresponding to the pulse width modulation signal and having the direct-current voltage superimposed thereon, when the analog speed-specifying signal and the digital speed-specifying signal are input to the first input terminal and the second input terminal, respectively.

6. The motor speed control integrated circuit according to claim 1, comprising two chips of:
a first circuit integrated that makes a current flow through the drive coil of the motor thereby driving the motor;
a second circuit integrated that includes the first and second input terminals; the reference voltage circuit; the comparator; and the control signal generator, and controls the amount of current flowing through the drive coil of the motor via the first circuit according to the control signal generated by the control signal generator thereby controlling the rotational speed of the motor.

7. The motor speed control integrated circuit according to claim 1, which is an integrated chip of:
a first circuit that makes a current flow through the drive coil of the motor thereby driving the motor; and
a second circuit that includes the first and second input terminals; the reference voltage circuit; the comparator; and the control signal generator and controls the amount of current flowing through the drive coil of the motor via the first circuit according to the control signal generated by the control signal generator thereby controlling the rotational speed of the motor.

8. A motor speed controller which controls a rotational speed of a motor by controlling the amount of current flowing through a drive coil of the motor, the motor speed control comprising:
a series connection of a resistor and a thermistor to which a direct-current voltage to specify the rotational speed of the motor is applied, the series connection dividing the direct-current voltage to provide a divided voltage
a motor speed control integrated circuit comprising
a first input terminal adapted to receive an analog speed-specifying signal specifying the rotational speed of the motor, the first input terminal receiving the divided voltage;
a second input terminal adapted to receive a digital speed-specifying signal specifying the rotational speed of the motor;
a reference voltage circuit that generates a reference voltage corresponding to the analog speed-specifying signal and/or the digital speed-specifying signal;
a comparator that compares a speed voltage corresponding to the actual rotational speed of the motor and the reference voltage; and
a control signal generator that generates and outputs a control signal for controlling the amount of current flowing through the drive coil based on the comparing result of the comparator,
wherein the reference voltage circuit uses as the reference voltage the divided voltage.

9. A motor speed controller which controls a rotational speed of a motor by controlling the amount of current flowing through a drive coil of the motor, the motor speed control comprising:
a motor speed control integrated circuit comprising
a first input terminal adapted to receive an analog speed-specifying signal specifying the rotational speed of the motor;
a second input terminal adapted to receive a digital speed-specifying signal specifying the rotational speed of the motor;
a reference voltage circuit that generates a reference voltage corresponding to the analog speed-specifying signal and/or the digital speed-specifying signal;
a comparator that compares a speed voltage corresponding to the actual rotational speed of the motor and the reference voltage; and
a control signal generator that generates and outputs a control signal for controlling the amount of current flowing through the drive coil based on the comparing result of the comparator;
a smoothing capacitor connected to the first input terminal; and
a processor communication-feasibly connected to the second input terminal,
wherein the digital speed-specifying signal applied to the second input terminal is a pulse width modulation signal specifying the rotational speed of the motor from the processor, and
wherein the reference voltage circuit uses as the reference voltage a voltage produced by the smoothing capacitor smoothing the pulse width modulation signal input from the processor to the second input terminal.

10. A motor speed controller which controls a rotational speed of a motor by controlling the amount of current flowing through a drive coil of the motor, the motor speed control comprising:
a series connection of a resistor and a thermistor to which a direct-current voltage to specify the rotational speed of the motor is applied, the series connection dividing the direct-current voltage to provide a divided voltage
a motor speed control integrated circuit comprising:
a first input terminal adapted to receive an analog speed-specifying signal specifying the rotational speed of the motor, the first input terminal receiving the divided voltage;
a second input terminal adapted to receive a digital speed-specifying signal specifying the rotational speed of the motor, the second terminal receiving a pulse width modulation signal specifying the rotational speed of the motor;
a reference voltage circuit that generates a reference voltage corresponding to the analog speed-specifying signal and/or the digital speed-specifying signal;
a comparator that compares a speed voltage corresponding to the actual rotational speed of the motor and the reference voltage; and a control signal generator that generates and outputs a control signal for controlling the amount of current flowing through the drive coil based on the comparing result of the comparator;

a smoothing capacitor connected to the first input terminal; and a processor communication-feasibly connected to the second input terminal, wherein the reference voltage circuit uses as the reference voltage the divided voltage applied to the first input terminal laid over a voltage produced by the smoothing capacitor smoothing the pulse width modulation signal input from the processor to the second input terminal.

* * * * *